(12) United States Patent
McAlister

(10) Patent No.: US 9,133,011 B2
(45) Date of Patent: Sep. 15, 2015

(54) SYSTEM AND METHOD FOR PROVIDING CUSTOMIZED RENEWABLE FUELS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

(*) Notice: Subject to any disclaimer, the term of this patent is extended or adjusted under 35 U.S.C. 154(b) by 0 days.

(21) Appl. No.: 13/834,293

(22) Filed: Mar. 15, 2013

(65) Prior Publication Data

US 2014/0263401 A1    Sep. 18, 2014

(51) Int. Cl.
 *B67D 7/04* (2010.01)
 *H01M 8/04* (2006.01)
 *B67D 7/74* (2010.01)
 *F17C 5/00* (2006.01)

(52) U.S. Cl.
 CPC ............. *B67D 7/04* (2013.01); *H01M 8/04425* (2013.01); *H01M 8/04753* (2013.01); *H01M 8/04798* (2013.01); *B67D 7/74* (2013.01); *B67D 2007/0442* (2013.01); *F17C 5/00* (2013.01); *H01M 2250/20* (2013.01); *Y02E 60/50* (2013.01); *Y02T 90/32* (2013.01); *Y10T 137/8593* (2015.04)

(58) Field of Classification Search
 CPC ................................ B67D 7/04; B67D 7/0401
 USPC .................................... 141/1, 94–95, 98, 104
 See application file for complete search history.

(56) References Cited

U.S. PATENT DOCUMENTS

| 3,950,369 A | 4/1976 | Gent |
| 4,367,206 A | 1/1983 | Pinto |
| 4,424,118 A | 1/1984 | Rankel |

(Continued)

FOREIGN PATENT DOCUMENTS

| CN | 1918068 | 2/2007 |
| CN | 101448979 | 6/2009 |

(Continued)

OTHER PUBLICATIONS

Deluga et al.. "AviationBioguels: Hydrotreated Renewable Jet," *General Electric*. Presentation Dated: Feb. 23, 2010. 13 pages.

(Continued)

*Primary Examiner* — Nicolas A Arnett
(74) *Attorney, Agent, or Firm* — Perkins Coie LLP

(57) ABSTRACT

Systems and methods for providing customized renewable fuels are disclosed. The present invention can provide customized renewable fuels to users after communicating with users and receiving the information regarding the fuel requirements and their preference. The present invention also provides quality control mechanisms to maintain the qualities of renewable fuels and heat exchangers to improve the energy efficiency of the whole system. The system of the present invention includes: a first storage tank for storing a first renewable fuel; a second storage tank for storing a second renewable fuel; a communicator for receiving a first set of information from the user; a controller for receiving the first set of information from the communication device and generating a second set of information by analyzing the first set of information; and a dispenser for dispensing the first and the second renewable fuels to the user according to the second set of information.

21 Claims, 6 Drawing Sheets

(56) References Cited

U.S. PATENT DOCUMENTS

| | | | |
|---|---|---|---|
| 4,906,302 A | 3/1990 | Bruya | |
| 5,059,303 A | 10/1991 | Taylor et al. | |
| 5,630,528 A * | 5/1997 | Nanaji | 222/1 |
| 6,180,396 B1 | 1/2001 | Shigeki Ono | |
| 6,531,630 B2 | 3/2003 | Vidalin | |
| 6,673,742 B2 | 1/2004 | Abdo et al. | |
| 6,745,801 B1 * | 6/2004 | Cohen et al. | 141/231 |
| 6,875,794 B2 | 4/2005 | Seiki et al. | |
| 6,894,080 B2 | 5/2005 | Seiki et al. | |
| 6,984,305 B2 | 1/2006 | McAlister | |
| 7,082,969 B1 * | 8/2006 | Hollerback | 141/59 |
| 7,284,575 B2 * | 10/2007 | Gram et al. | 141/82 |
| 7,602,143 B2 * | 10/2009 | Capizzo | 320/109 |
| 7,608,439 B2 | 10/2009 | McTavish et al. | |
| 7,608,743 B2 | 10/2009 | Olah et al. | |
| 7,913,664 B2 * | 3/2011 | Williams et al. | 123/304 |
| 7,989,507 B2 | 8/2011 | Rising | |
| 8,070,835 B2 | 12/2011 | McAlister | |
| 8,215,342 B2 * | 7/2012 | McLean et al. | 141/11 |
| 8,485,233 B2 * | 7/2013 | Allinson et al. | 141/104 |
| 2003/0196810 A1 | 10/2003 | Vinegar et al. | |
| 2005/0055874 A1 * | 3/2005 | Bekemeyer | 44/629 |
| 2006/0169350 A1 * | 8/2006 | Hollerback | 141/59 |
| 2007/0137246 A1 | 6/2007 | McKellar et al. | |
| 2008/0243310 A1 | 10/2008 | Esposito et al. | |
| 2009/0005903 A1 * | 1/2009 | Winsness | 700/239 |
| 2009/0286890 A1 | 11/2009 | Joshi et al. | |
| 2009/0318572 A1 | 12/2009 | Sakai et al. | |
| 2011/0000579 A1 * | 1/2011 | Allinson et al. | 141/9 |
| 2011/0288738 A1 * | 11/2011 | Donnelly et al. | 701/99 |
| 2011/0291425 A1 | 12/2011 | Juranitch | |
| 2012/0205004 A1 * | 8/2012 | Webb | 141/98 |
| 2013/0112313 A1 * | 5/2013 | Donnelly et al. | 141/4 |

FOREIGN PATENT DOCUMENTS

| | | |
|---|---|---|
| DE | 3933285 A1 | 4/1991 |
| EP | 1002767 | 5/2000 |
| EP | 1219585 | 7/2002 |
| FR | 2897066 A1 | 8/2007 |
| GB | 2086416 A | 5/1982 |
| JP | 2003510403 A | 3/2003 |
| JP | 2005075925 A | 3/2005 |
| JP | 2005-289856 A | 10/2005 |
| JP | 2008537956 A | 10/2008 |
| JP | 2009242248 A | 10/2009 |
| WO | WO-2004092055 A2 | 10/2004 |
| WO | WO-2005021474 A1 | 3/2005 |
| WO | WO-2005033250 A2 | 4/2005 |
| WO | WO-2010078035 A2 | 7/2010 |

OTHER PUBLICATIONS

Dolan, Eric "Device uses sunlight to make liquid fuel". *The Raw Story*. Published: Dec. 24, 2010. 3 pages.

Lee et al.. "Biological Hydrogen Production: Prospects and Challenges". *Trends in Biotechnology* 28.5. Jan. 2010. 10 pages.

Lopez et al., "Performance of the Southern California Edison Company Stirling Dish," Contractor Report, Prepared by Sandia National Laboratories Albuquerque, New Mexico, California, Printed Oct. 1993, 213 pages.

\* cited by examiner

SYSTEM AND METHOD FOR PROVIDING CUSTOMIZED RENEWABLE FUELS

TECHNICAL FIELD

To the extent the foregoing application and/or any other materials incorporated herein by reference conflict with the disclosure presented herein, the disclosure herein controls. This application relates to techniques, systems, and methods related to providing customized renewable fuels to users in an energy-efficient way.

BACKGROUND

Vehicles including marine vessels operated around the world play an important role in energy consumption. By adopting renewable fuel systems, these vehicles or vessels can effectively reduce the energy consumption and thus improve energy efficiency. Having a friendly renewable-fuel-filling environment is crucial to achieve this goal, because it lowers the inconvenience that users may have when they commit to use renewable fuels. Thus, convenient fuel filling systems for renewable fuels and corresponding methods are advantageous to promote energy efficiency.

One problem is that, renewable fuel users may have different fuel requirements depending on various types of vehicles or vessels. For example, different types of fuel cells (e.g., with different working temperatures) require different hydrogen purity and thus have different demands on fuel qualities. Systems and methods that can provide users customized renewable fuels can resolve the problem mentioned above. Another problem comes with the objectionable constituents generated during the process of preparing renewable fuels. Such objectionable constituents can contaminate the environment, decrease the purity of renewable fuels, or cause dysfunction of catalysts. Therefore, finding a way to deal with this problem would be valuable. Further, the energy efficiency of the renewable fuel filling systems is also important. Sustainable designs for renewable fuel-filling systems that utilize energy efficiently can help minimize the total energy consumption and thus achieves the goal of energy conservation.

BRIEF DESCRIPTION OF THE DRAWINGS

Like reference symbols and designations in the various drawings indicate like elements.

DETAILED DESCRIPTION

Figure 1:
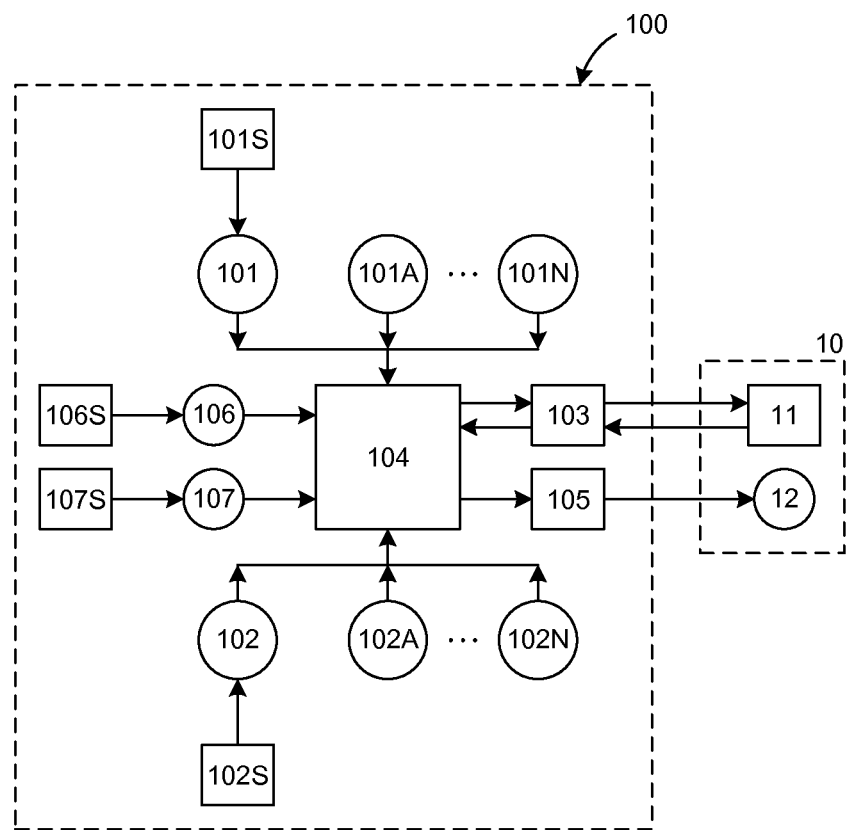
FIG. 1 is a schematic diagram, showing a system for providing customized renewable fuels in accordance with an embodiment of the present invention.

Techniques, systems and methods are disclosed for providing customized renewable fuels for users in an energy-efficient way.

In one aspect, a system for providing customized renewable fuels to a user can include: a first storage tank for storing a first renewable fuel; a second storage tank for storing a second renewable fuel; a communicator, receiving a first set of information from the user; a controller, receiving the first set of information from the communication device and generating a second set of information by analyzing the first set of information; and a dispenser, selectively dispensing the first and the second renewable fuels to the user according to the second set of information. The system can communicate with users and provide users with high quality customized renewable fuels.

In another aspect, a sustainable fuel filling system can include: a heat exchanger, configured to use liquid air to absorb heat energy from a gaseous renewable fuel and to transform, at least partially, the renewable fuel into a liquid state; a storage tank, for storing the renewable fuel; a communicator, receiving a first set of information from a user; a controller, receiving the first set of information from the communicator and generating a second set of information by analyzing the first set of information; and a dispenser, connected to the storage tank, dispensing the renewable fuel to the user according to the second set of information. The system can utilize the liquid air as a heat sink to absorb heat energy from a gaseous renewable fuel and transform it into a liquid form, which is more convenient and easier to be stored and transported. The system can also separate the liquid air into different types of gases for further uses.

Implementations of the systems mentioned above can optionally include one or more of the following features. For example, the communicator can receive the first set of information by automatically provided by user-end communication devices, via detecting the statuses of users' vehicles, and/or by users' manual inputs. The renewable fuels to be dispensed can be mixed before dispensing to users and can be stored in pre-mixed storage tanks. In addition, the communicator can provide a third set of information (such as travel information) to users, either automatically or upon request. The system can further include at least one heat engine to generate heat energy and electricity for the system, and to remove an objectionable constituent in renewable fuels for certain applications such as fuel for vehicles operating underground, in closed buildings or in critical zones of highly congested communities. The system can further include a solar device to convert solar energy into energy such as heat used for a thermo-chemical reformation device to generate renewable fuels, such as monoxide, hydrogen or fuel alcohols such as methanol. The system can also include an electrolyzer to improve the process efficiency and/or purity of the renewable fuel such as hydrogen. The system can further include a quality assurance module to control energy and/or volumetric qualities of the renewable fuels. The system can include separate storage tanks to store renewable fuels with higher purity. The sources of renewable fuels can vary depending on different designs.

In yet another aspect, a method for providing customized renewable fuels to a user can include: storing a first renewable fuel in a first storage tank; storing a second renewable fuel in a second storage tank; receiving a first set of information from the user via a communicator; transmitting the first set of information to a controller; generating a second set of information by the controller by analyzing the first set of information; and selectively dispensing the first and the second renewable fuels to the user according to the second set of information. The method can provide users with customized renewable fuels by communicating with users in advance.

Implementations of the above method can optionally include one or more of the following features. For example, the first set of information can be provided by user-end communication devices automatically, via detecting the statuses of users' vehicles, or users' manual inputs including instructions for accomplishing various goals such as maximizing range, power production, noise reduction, or air-cleaning operation by utilization of hydrogen or ammonia in a combustion engine. The method can further include: mixing the renewable fuels to be dispensed before dispensing and storing the mixed renewable fuels in pre-mixed storage tanks. The method can also include: providing a third set of information to the user; and absorbing heat energy from gaseous renewable fuels and transforming, at least partially, the renewable fuels into a liquid state. The method can include: generating heat energy and electricity for the system by a heat engine and removing an objectionable constituent in the renewable fuels by an engine. The method can also include: converting solar energy into heat energy for a thermo-chemical reformation device to generate the renewable fuels, such as monoxide, hydrogen, or methanol. The method can further include: improving the purity of the renewable fuel by electrolysis; and controlling qualities of the renewable fuels by monitoring statuses of the renewable fuels and simulating the user's utilization of the renewable fuels, such as hydrogen.

The subject matter described in this specification potentially can provide one or more of the following advantages. For example, the described techniques, systems, and methods can be used to provide renewable fuel users a convenient and safe way to fill customized renewable fuels. In addition, the systems and the methods can remove objectionable constituents in the renewable fuels, recycle waste energy for further use, and create a sustainable fuel-filling system for renewable fuels.

Exemplary Systems and Methods

Techniques, systems and methods for providing customized renewable fuels to users in an energy-efficient way are disclosed. More particularly, sustainable systems and methods that can communicate with users and provide customized renewable fuels according to users' fuel requirements are disclosed.

FIG. 1 shows a system 100 for providing customized renewable fuels to a user's vehicle (or vessel) 10. As shown in FIG. 1, the system 100 includes a first storage tank 101 (and 101A-101N), a second storage tank 102 (and 102A-102N), a communicator 103, a controller 104, and a dispenser 105. The first storage tank 101 can store a first renewable fuel, such as hydrogen ($H_2$), coming from a first renewable fuel source 101S. The system 100 can have more than one first storage tank 101 (e.g., first storage tanks 101A-101N as shown in FIG. 1), depending on system designs (e.g., total supply volume of the first renewable fuel). Similarly, the second storage tank 102 stores a second renewable or non-renewable fuel, such as methane ($CH_4$), propane ($C_3H_8$), butane ($C_4H_{10}$), gasoline, hydrocarbon, natural gas (NG) or liquid natural gas (LNG), coming from a second renewable fuel source 102S. The system 100 can also have more than one second storage tank 102 (e.g., second storage tanks 102A-102N, as shown in FIG. 1), depending on system designs (e.g., total supply volume of the second renewable fuel. Even though only two kinds of renewable fuels are discussed in FIG. 1, in other embodiments, the system 100 can have more than two kinds of fuels.

The communicator 103 is designed to communicate with and receive a first set of information from the user or the vehicle 10. The first set of information generally relates to the status of the vehicle 10 and/or the fuel requirements. For example, the first set of information can include a required percentage range of a certain renewable fuel, a required purity, and/or a required total amount of the renewable fuels to be dispensed by the system 100. In some embodiments, the first set of information can include vehicle status information, such as the manufacturer of the vehicle 10, engine types, fuel cell types, mileages, or fuel efficiency. As shown in FIG. 1, the vehicle 10 can include a user-end communication device 11 and a user-end storage tank 12. The user-end communication device 11 can provide the first set of information to the communicator 103 automatically (e.g., when the user-end communication device 11 senses a connection with the communicator 103) or upon a request from the communicator 103 (e.g., the communicator can send a signal to request access to the status information of the vehicle 10). In some embodiments, the user-end communication device 11 can be a vehicle computer. In other embodiments, the first set of information can be received by users' manual inputs. For example, the communicator 103 can communicate with users through a user interface (not shown) and provides with a questionnaire that allows users to input the first set of information quickly.

Once the first set of information has been received by the communicator 103, it is transmitted to the controller 104. The controller 104 then analyzes the first set of information and determines whether the system 100 is capable of providing the user with requested renewable fuels. If not, then the controller 104 will can generate a second set of information (e.g., in a form of a short message) to the user, stating that the system 100 cannot provide requested renewable fuels with reasons (if known) or without reasons (e.g., unknown reason to cause the system dysfunction). The reasons can include insufficient stored fuels, disqualifying purity of fuels, or other safety reasons (e.g., requested fuels from the user's manually input may cause damages to the vehicle 10; this may be caused by an incorrect user input or users' lack of knowledge).

If the controller 104 determines that the system 101 can provide the requested renewable fuels, then it can generate a second set of information regarding how the system 100 can prepare and provide the requested renewable fuels. For example, the second set of information can include a specific amount or type of a renewable fuel from a specific storage tank (e.g., 50 gallon of gaseous first renewable fuel from the first storage tank 101A), a route that the requested renewable fuels to be transported from storage tanks to the user, any necessary pre-condition (e.g., adjusting the temperature or purity of the fuels), or any fuel pre-mixing (e.g., the user requests a mixture of 30% of the first renewable fuel and 70% of the second renewable fuel). The controller 104 can then instruct the dispenser 105 to selectively dispense the first and the second renewable fuels to the user-end storage tank 12 based on the second set of information determined by the controller 104.

In some embodiments, the system 100 can provide a third set of information to the user (or to the vehicle 10) while communicating. The third information can be provided automatically or upon the user's request. The third set of information can include general traveling information, such as points of interests, maps, weather, fuel station locations, or lodging recommendations. In other embodiments, the third set of information can include assorted advertisements or other information that users may want to access.

As shown in FIG. 1, the system 100 can include a third storage tank 106 and a fourth storage tank 107. The third storage tank 106 can store the first renewable fuel with a higher purity than the first renewable fuel stored in the first storage tank 101 (or 101A-101N). Similarly, the fourth storage tank 107 can store the second renewable fuel with a higher purity than the second renewable fuel stored in the second storage tank 102 (or 102A-102N). The high purity renewable fuels can come from different sources. For example, the first high-purity source 106S provides high purity first renewable fuels to the third storage tank 106, while the second high-purity source 107S provides high purity second renewable fuels to the fourth storage tank 107. Having various storage tanks with different levels of purity of renewable fuels, the system 100 can provide a variety of different combinations of renewable fuels that satisfy different purity requirements. For example, the vehicle 10 can be moved by fuel cells, which include high, medium and low temperature types. Different types of fuel cells have different requirements for hydrogen purity. Specifically, low and medium temperature types of fuel cells require high purity hydrogen as renewable fuels. Therefore, the system 100 can provide customized and suitable renewable fuels to the vehicle 10, based on communication between the system 100 and the user (or the vehicle 10).

Figure 2:
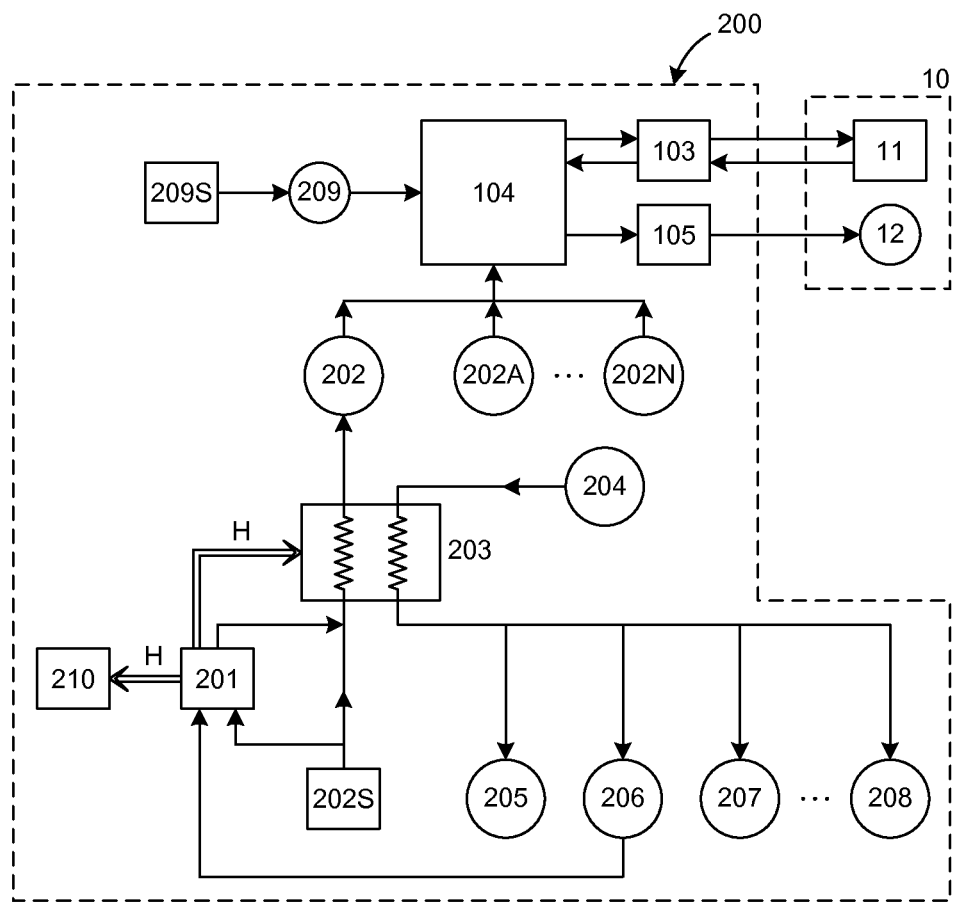
FIG. 2 is a schematic diagram, showing a sustainable fuel-filling system in accordance with an embodiment of the present invention.

FIG. 2 shows a sustainable fuel-filling system 200 in accordance with an embodiment of the present invention. As shown in FIG. 2, the system 200 includes a communicator 103, a controller 104, a dispenser 105, an engine 201, a storage tank 202, a heat exchanger 203, a liquid air storage tank 204, a nitrogen storage tank 205, an oxygen storage tank 206, an argon storage tank 207, a carbon dioxide storage tank 208, a high-purity storage tank 209, and a generator 210. The system 200 can have more than one storage tank 202, such as storage tanks 202A-202N, depending on different system designs. The storage tank 202 can store a renewable fuel, such as methane, propane, butane, gasoline, hydrocarbon, NG, LNG, or hydrogen, coming from a renewable fuel source 202S.

Similar to the embodiments described in FIG. 1 above, the communicator 103 of the system 200 can communicate with the user-end communication device 11 in the vehicle 10, and receive a first set of information, which relates to fuel requirements and/or the vehicle status. In other embodiments, the first set of information can be received by users' manual inputs. The controller 104 can analyze the first set of information and generate a second set of information that relates to whether (and how) the system 200 can supply the requested renewable fuels. The dispenser 105 can selectively dispense the requested renewable fuel to the user-end storage tank 12. The system 200 can also provide a third set of information to the user while communicating. The third information can be provided automatically or upon users' request. The third set of information can include general traveling information, such as points of interests, maps, weather, fuel station locations, or lodging recommendations. In other embodiments, the third set of information can include assorted advertisements or other information that users may want to access.

In FIG. 2, the high-purity storage tank 209 can store the renewable fuel with a higher purity than to the renewable fuel stored in the storage tank 202 (and 202A-202N). The high purity renewable fuel can come from a high purity source 209S, different from the renewable fuel source 202S. One advantage of having the high-purity storage tank 209 is that the system 200 can adjust the level of purity of the renewable fuel to be dispensed and/or the amount of carbon dioxide produced (if any) by mixing the renewable fuels in the storage tank 202 with those in the high-purity storage tank 209, according to the second set of information determined by the controller 104.

As shown in FIG. 2, the heat exchanger 203 is configured between the storage tank 202 and the renewable fuel source 202S, to transform, at least partially, a gaseous renewable fuel into a liquid phase (e.g., NG becomes LNG) for easy storage. The heat energy taken from the gaseous renewable fuel is absorbed by a liquid air provided by the liquid air storage tank 204. The liquid air can be prepared by a cryogenic process that lowers the temperature below the boiling points of constituents of the air, as shown in Table 1 below.

TABLE 1

| SUBSTANCE | BOILING POINT (° C.) | BOILING POINT (° F.) |
|---|---|---|
| HYDROGEN | −253 | −423 |
| NITROGEN | −196 | −328 |
| ARGON | −186 | −303 |
| OXYGEN | −183 | −297 |
| METHANE | −161 | −257 |
| $CO_2$ | −79 | −109 |
| $C_3H_8$ | −43 | −45 |
| AMMONIA | −35.5 | −28.1 |
| METHANOL | 66 | 151 |
| ETHANOL | 78 | 173 |

After absorbing heat energy from the heat exchanger 203, the liquid air can be pressurized or vaporized, at least partially, into a gaseous form. Due to different boiling points (Table 1 above) constituents of the liquid air (Table 2 below) can be separated by controlling the ambient exchange temperature and then stored individually. For example, nitrogen separated from the liquid air can be stored in the nitrogen storage tank 205. Similarly, separated oxygen can be stored in the oxygen storage tank 206, separated argon can be stored in the argon storage tank 207, and separated carbon dioxide can be stored in the carbon dioxide storage tank 208. In other embodiments, the constituents of the liquid air may be different, depending on different designs. The system 200 can have a plurality of additional storage tank to store other separated gases (such as, the substances listed in Table 1 above or the constituents listed in Table 2 below). In other embodiments, the separated gases can be stored in a liquid form.

TABLE 2

| Air Constituent | Symbol | Volumetric % |
|---|---|---|
| NITROGEN | $N_2$ | 78.08 |
| OXYGEN | $O_2$ | 20.95 |
| ARGON | Ar | 0.93 |
| CARBON DIOXIDE | $CO_2$ | 0.033 |
| NEON | Ne | 0.0018 |
| METHANE | $CH_4$ | 0.0002 |
| KRYPTON | Kr | 0.00011 |
| NITROUS OXIDE | $N_2O$ | 0.00005 |
| XENON | Xe | 0.0000087 |

The stored gases can be used for various industrial purposes. For example, separate nitrogen stored in the nitrogen storage tank 205 can be used to produce ammonia, fertilizers and nitrogenous chemicals. Separated oxygen stored in the oxygen storage tank 206 can be used to produce various oxides, or to facilitate the combustion in the engine 201. Separated argon stored in the argon storage tank 207 can be used as an inert medium for welding or other types of electronic and furnace process works. Separated carbon dioxide stored in the carbon dioxide storage tank 208 can be used to produce fine chemicals, to prepare various food and beverages, or to improve photosynthesis. In other embodiments, the separated gases can be used for other utilization known by those skilled in the art. Further, the separated gases can be transformed into other phases (liquid or even solid) if specific utilization requires so (e.g. solid carbon dioxide).

As shown in FIG. 2, the engine 201 can provide heat energy H to the heat exchanger 203. In addition to the heat provided by the phase change of the renewable fuels, the heat energy H provided by the engine 201 can be used as another source of heat, to adjust or control the heat exchange happened in the heat exchanger 203. For example, if the heat energy provided by phase change of the renewable fuels is insufficient to pressurize the liquid air during certain period of time, the heat energy H provided by the engine 201 can be used to maintain the continuous production of separated gases. Further, the engine 201 can also provide the heat energy H to the generator 210, to generate electricity that can be used inside or outside the system 200. In addition, the engine 201 can remove the objectionable constituents (e.g., impurities) in the renewable fuels by combustion. As show in FIG. 2, the gaseous renewable fuels from the renewable fuel source 202S can be first directed to the engine 201 to remove any contaminants or undesired substances by internal combustion. After the removing process, the renewable fuels can be directed to the heat exchanger 203 for further process, as discussed above.

Figure 3:
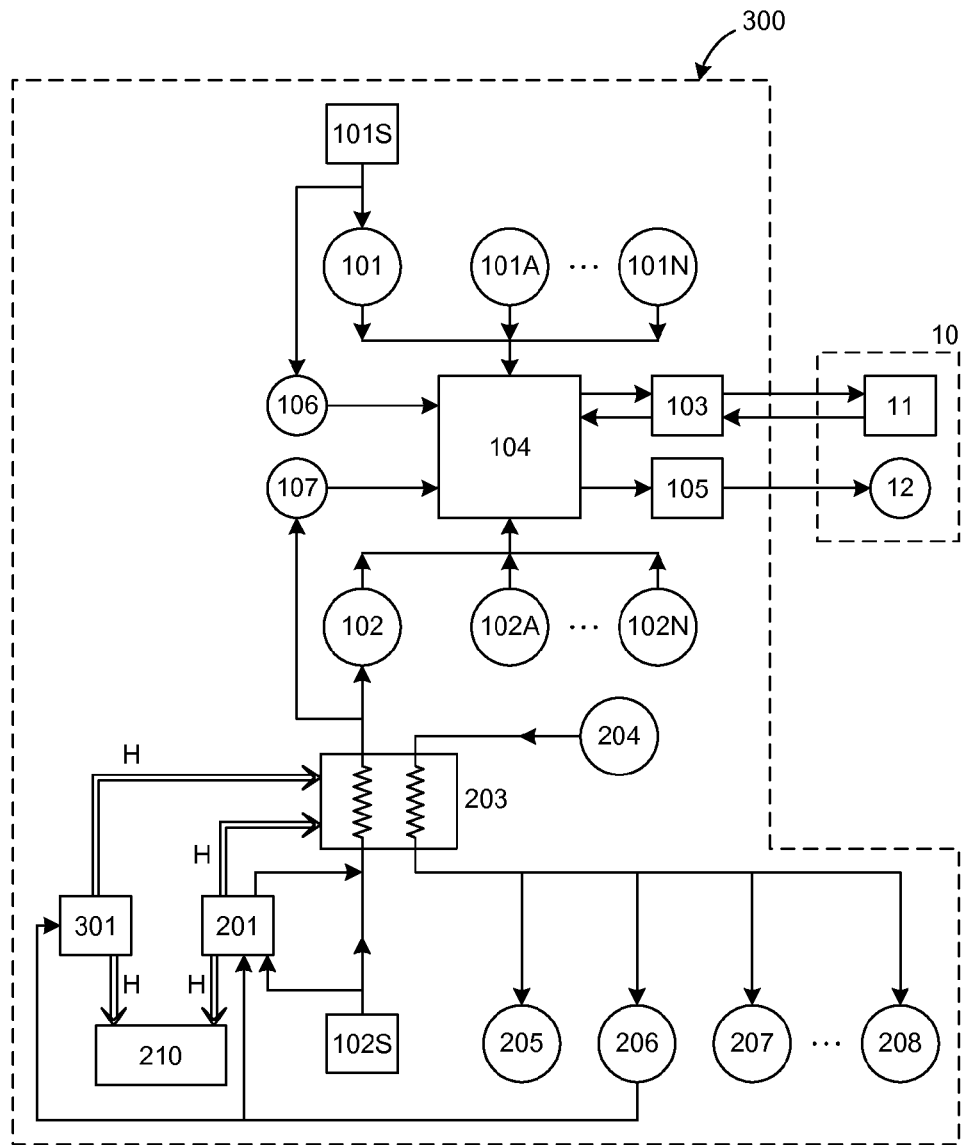
FIG. 3 is a schematic diagram, showing another sustainable fuel-filling system in accordance with an embodiment of the present invention.

FIG. 3 shows another embodiment of the sustainable fuel-filling system 300 of the present invention. In FIG. 3, the system 300 can include a first storage tank 101, a second storage tank 102, a communicator 103, a controller 104, a dispenser 105, a third storage tank 106, a fourth storage tank 107, two engines 201 and 301, a heat exchanger 203, a liquid air storage tank 204, a nitrogen storage tank 205, an oxygen storage tank 206, an argon storage tank 207, a carbon dioxide storage tank 208, and a generator 210. Similar to the embodiments described in FIG. 1 and FIG. 2, the communicator 103 of the system 300 can communicate with the user-end communication device 11 of the vehicle 10, and receive a first set of information, which relates to fuel requirements and the vehicle status. In other embodiments, the first set of information can be received by users' manual inputs. The controller 104 can then analyze the first set of information and generate a second set of information that relates to whether (and how) the system 300 can supply the requested renewable fuels. The dispenser 105 can selectively dispense the first and the second renewable fuels to the user-end storage tank 12, according to the second set of information determined by the controller 104. The system 300 can also provide a third set of information to the user while communicating. The third information can be provided automatically or upon users' request. The third set of information can include general traveling information, such as points of interests, maps, weather, fuel station locations, or lodging recommendations. In other embodiments, the third set of information can include assorted advertisements or other information that users may want to access.

Similar to the embodiments described in FIG. 2, the exchanger 203 is configured between the second storage tank 102 and the second renewable fuel source 102S, to transform, at least partially, a gaseous second renewable fuel into a liquid phase (e.g., NG becomes LNG) for easy storage. The heat energy taken from the gaseous second renewable fuel is absorbed by a liquid air provided by the liquid air storage tank 204. After absorbing heat energy in the heat exchanger 203, the liquid air can be pressurized or vaporized into a gaseous form. Due to different boiling points, constituents of the liquid air can be separated by and stored individually. For example, nitrogen separated from the liquid air can be stored in the nitrogen storage tank 205. Similarly, separated oxygen can be stored in the oxygen storage tank 206, separated argon can be stored in the argon storage tank 207, and separated carbon dioxide can be stored in the carbon dioxide storage tank 208. The system 300 can have a plurality of additional storage tank to store other separated gases (or in a liquid form), depending on the design of the system 300. In other embodiments, the separated gases can be stored in a liquid form.

The system 300 differs from the embodiments described in FIGS. 1 and 2 in at least two aspects. First, the system 300 includes two engines 201 and 301. Both engines 201 and 301 can provide heat energy H to the generator 210 to generate electricity used either inside or outside the system 300, and to the exchanger 203 to facilitate the pressurization of the liquid air stored in the liquid air storage tank 204. Also, both engines 201 and 301 can remove objectionable substances in the renewable fuels as discussed above. In other embodiments, the numbers of the engines 201 and 301 can vary depending on different system designs. Second, the renewable fuels with different levels of purity can come from the same source in the system 300. The third storage tank 106 can be used to store the first renewable fuel with a higher purity than the first renewable fuel stored in the first storage tank 101. Similarly, the fourth storage tank 107 can be used to store the second renewable fuel with a higher purity than the second renewable fuel stored in the second storage tank 102. For example, the first renewable fuel source 101S can provide a first renewable fuel with different levels of purity, which can be stored in the first storage tank 101 and the third storage tank 106, respectively. Similarly, the second renewable fuel source 102S can provide a second renewable with different levels of purity, which can be stored in the second storage tank 102 and the fourth storage tank 107, respectively. In other embodiments, the system 300 can provide a purification mechanism in order to provide more than one level of purity for the same type of renewable fuel.

Figure 4:
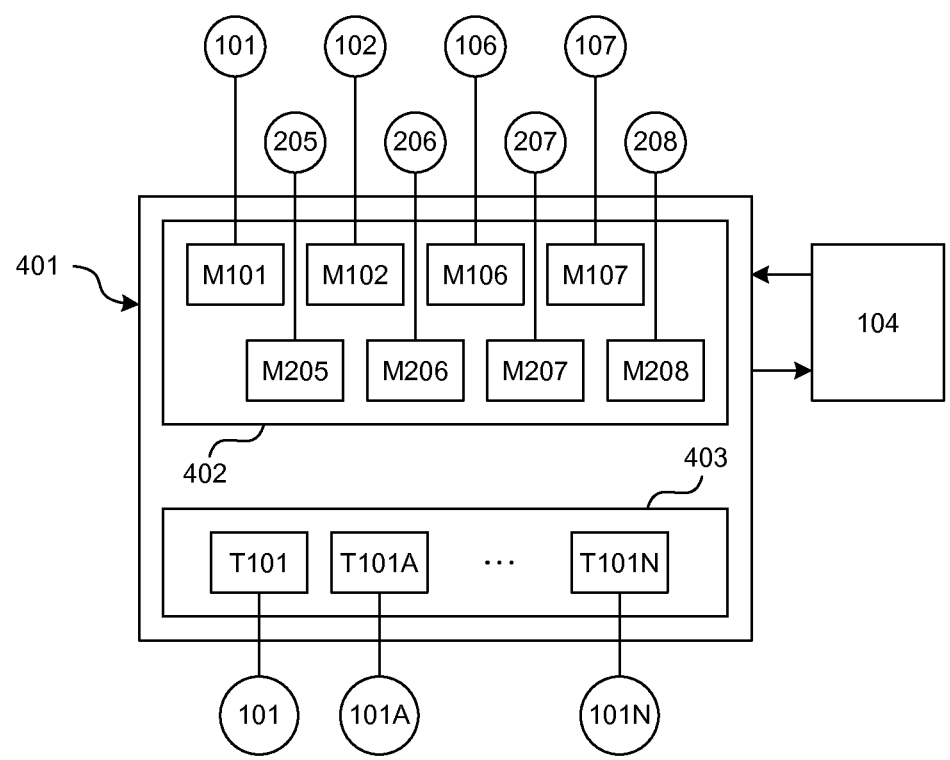
FIG. 4 is a schematic diagram, showing a quality assurance module of the system described in FIG. 3.

FIG. 4 shows a quality assurance module 401 of the system 300. Referring to both FIG. 3 and FIG. 4, the quality assurance module 401 can include a monitoring unit 402 and a testing unit 403. The monitoring unit 401 can include sensors M101, M102, M106, M107, M205, M206, M207, and M208 connected to, or positioned in, the storage tanks 101, 102, 106, 107, 205, 206, 207, and 208, respectively. Through the sensors M101, M102, M106, M107, M205, M206, M207, and M208, the monitoring unit 401 can periodically monitor the status of all the renewable fuels stored in the system 300 and transmits related status information to the controller 104. In other embodiments, the controller 104 can request the monitoring unit 401 to check the status of the renewable fuel stored in certain storage tank, and the monitoring unit 401 can find the corresponding sensor to conduct requested checkup and then sends back the result to the controller 104. In other embodiments, the sensors can be positioned close to any valves, pipelines, joints, or nozzles in the system. The methods for monitoring can include acoustical, infrared, optical and ultraviolet techniques based upon speed of sound, refraction of light, or upon the attenuation of beam strength, or absorptive nature of substances present in the fuels. In other embodiments, the sensor can also be placed in the liquid air storage tank 204 or other storage tanks (e.g., 101A-101N, or 102A-102N), As shown in FIG. 4, the testing unit 403 can include simulators T101, T101A . . . T101N connected to the first storage tanks 101, 101A . . . 101N. The testing unit 403 can simulate how the first renewable fuel would be used by the vehicle 10, in order to assure the quality of the first renewable fuel. For example, in some embodiments, the first renewable fuel can be hydrogen, and the testing unit 403 can include a specific type of fuel cell that the vehicle 10 has. Before dispensing the requested hydrogen to the vehicle 10, the testing unit 403 can simulate the result by actually applying the fuel in the fuel cell (as simulator) to see whether it can work properly. The testing units 403 can periodically conduct the simulation or upon requests from the controller 104. In other embodiments, the testing unit can include various types of simulators, depending on different types of vehicles 10. In other embodiments, the simulators are not exclusive for first storage tanks 101, 101A . . . 101N, but can be applied to other storage tanks, depending on different system designs.

Figure 5:
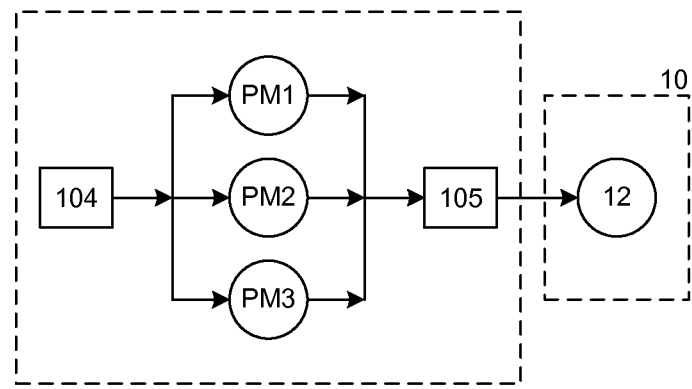
FIG. 5 is a schematic diagram, showing pre-mixed storage tanks in accordance with an embodiment of the present invention.

FIG. 5 shows pre-mixed storage tanks PM1, PM2 and PM3 in accordance with an embodiment of the present invention. The systems 100, 200, and 300 can provide pre-mixed renewable fuels for the convenience of the users. As shown in FIG. 5, the controller 104 can mix renewable fuels from different types (such as, 30% of the first renewable fuel and 70% of the second renewable fuel) and/or from different levels of purity. In other embodiments, the renewable fuels in different phases can also be mixed. The mixture of renewable fuels can be decided by the frequency of usage or user preferences based on prior fuel-filling transactions or related surveys. In the embodiments described in FIG. 5, the mixed renewable fuels can be stored separately in pre-mixed storage tanks PM1, PM2 and PM3. Upon a request from the user, the mixed renewable fuels, selected from premixed tanks PM1, PM2 and PM3, can be dispensed via the dispenser 105 to the user-end storage tank 12 of the vehicle 10. In other embodiments, the number of the pre-mixed tanks can be determined by system design.

Figure 6:
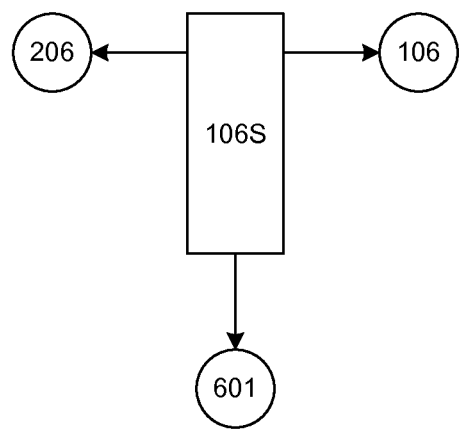
FIG. 6 is a schematic diagram, showing a high-purity source of a renewable fuel in accordance with an embodiment of the present invention.

FIG. 6 shows an embodiment of the first high-purity source 106S of the present invention. In this embodiment, the first high-purity source 106S can be an electrolyzer and the first renewable fuel is hydrogen. The water storage 601 provides water to be electrolyzed in the first high-purity source 106S, and hydrogen and oxygen, both with high purity, can be generated. Generated hydrogen can be transported and stored in the third storage tank 106 (see FIGS. 1 and 3) and generated oxygen can be transported and stored in the oxygen storage tank 206 (see FIGS. 2 and 3) for further uses. Electrolysis provides a convenient way to generate hydrogen with high purity. The necessary electricity can be provided by the generator 210 and/or by solar thermal or photovoltaic devices, and/or by generators powered by moving water or wind and/or by geothermal energy conversion systems.

Figure 7:
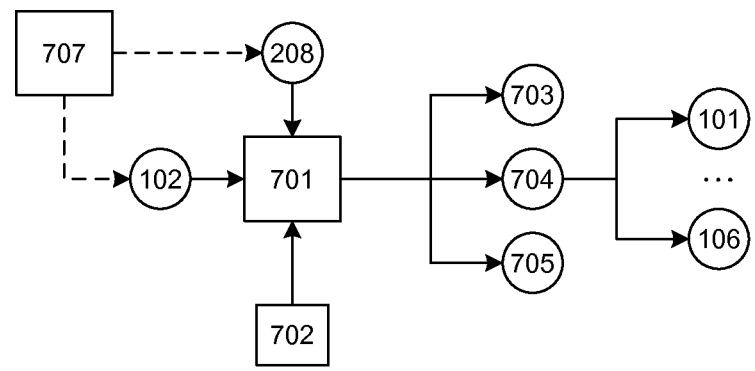
FIG. 7 is a schematic diagram, showing a thermo-chemical reformation device and a solar device in accordance with an embodiment of the present invention.

FIG. 7 shows a thermo-chemical reformation device 701 and a renewable energy conversion system such as solar device 702 of the present invention. Illustratively, the systems 100, 200, and 300 can include a thermo-chemical reformation device 701, a solar device 702 and an organic feedstock 707, to produce various types of renewable fuels, such as carbon monoxide (CO), hydrogen, or liquid fuels such as methanol ($CH_3OH$). As shown in FIG. 7, anaerobic digestion of organic substances (e.g., from waste water) in the organic feedstock 707 can generally produce carbon dioxide ($CO_2$) and methane, as shown in the Equation 1 below. The generated methane can be stored in the second storage tank 102 (see FIG. 1 or FIG. 3) or the storage tank 202 (not shown in FIG. 7; see FIG. 2). The generated carbon dioxide can be stored in the carbon dioxide storage tank 208 (see FIG. 2 or FIG. 3).

$$C_xH_yO_z \rightarrow CH_4 + CO_2 \quad \text{Equation 1}$$

The thermo-chemical reformation device 701 can generate hydrogen and carbon monoxide by adding heat energy, as shown in Equation 2 below. The solar device 702 can receive solar energy and transform the solar energy into heat energy necessary for the chemical process described in Equation 2. The generated hydrogen and carbon monoxide can further produce methanol, as shown in Equation 3 below. The generated carbon monoxide can be stored in the carbon monoxide storage tank 703. The generated hydrogen can be stored in the hydrogen storage tank 704. In some embodiments, the hydrogen can be further transported to the first storage tank 101 (or 101A-101N) or the third storage tank 106. The generated methanol can be stored in the methanol storage tank 705. The systems 100, 200 and 300 can include these storage tanks 703, 704, or 705 and provide users with the renewable fuels stored thereof.

$$CO_2 + CH_4 + HEAT \rightarrow 2CO + 2H_2 \quad \text{Equation 2}$$

$$2CO + 2H_2 \rightarrow 2CH_3OH \quad \text{Equation 3}$$

Figure 8:
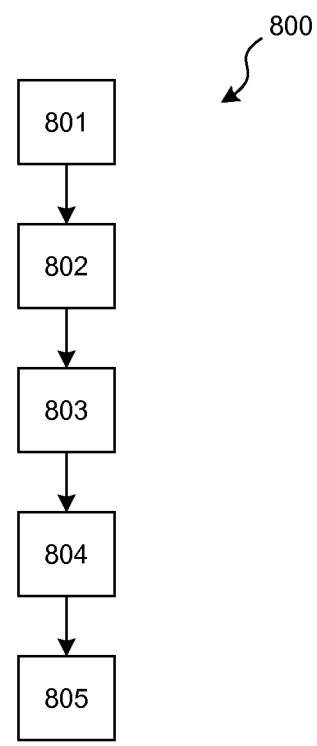
FIG. 8 is a flowchart, showing a method for providing customized renewable fuels in accordance with an embodiment of the present invention.

FIG. 8 shows a method 800 for providing customized renewable fuels in accordance with an embodiment of the present invention. The method 800 starts at block 801 by storing a first renewable fuel in a first storage tank 101 and storing a second renewable fuel in a second storage tank 102. The first renewable fuel can be hydrogen. The second renewable fuel can be methane, propane, butane, gasoline, NG or LNG. The first renewable fuel can be supplied by the first renewable fuel source 101S, and the second renewable fuel can be supplied by the second renewable fuel source 102S. In some embodiments, the renewable fuels can be mixed before dispensing, and the mixed renewable fuels can be stored separately (as shown in FIG. 5). The mixture of renewable fuels before dispensing is determined by the frequency of usage or user preferences based on prior fuel filling transactions or related surveys. In other embodiments, the first renewable fuel can be supplied by a first high-purity source 106S, which provides the first renewable fuel with higher purity. In some embodiments, the first renewable fuel can be hydrogen and the first high-purity source 106S can be an electrolyzer that provides hydrogen with high level of purity. Similarly, the second renewable fuel can be supplied by a second high-purity source 107S, which provides the second renewable fuel with high level of purity.

In FIG. 8, the method 800 then continues at block 802 by receiving a first set of information from the user via a communicator 103. The first set of information relates to the status of the vehicle (e.g., the manufacturer of the vehicle, engine types, fuel cell types, mileages, or fuel efficiency) and the fuel requirements (e.g., a required percentage range of a certain renewable fuel, a required purity, or a required total amount of the renewable fuels). The first set of information can be received by the communicator 103 via a user-end communication device 11, through detecting the status of the vehicle 10, and/or by the user's manually input.

In FIG. 8, the method 800 continues at block 803 by transmitting the first set of information to a controller 104. Once the first set of information has been received by the communicator 103, it is transmitted to the controller 104 for further analysis. The controller 104 then analyzes the first set of information and determines whether there is a feasible way to fulfill the user's request.

The method 800 then continues at block 804 by generating a second set of information by the controller by analyzing the first set of information. The second set of information can be include a short message staring that requested renewable fuels cannot be provided (with or without reasons), or information regarding how the requested renewable fuels can be provided to the user. In some embodiments, a third set of information can also be provided to the user while communicating. The third information can be provided automatically or upon users' request. The third set of information can include traveling information, such as points of interests, maps, weather, fuel station locations, or lodging recommendations. The third set of information can also include assorted advertisements or other information that users may want to access.

The method 800 continues at block 805 by selectively dispensing the first and the second renewable fuels to the user according to the second set of information. The controller 104 can instruct the dispenser 105 to selectively dispense the first and the second renewable fuels to the user-end storage tank 12 based on the second set of information.

The method 800 can further include a step of controlling qualities of the renewable fuels by monitoring statuses of the renewable fuels and simulating the user's utilization of the renewable fuels. The status of the renewable fuels can be monitored by the monitoring unit 402 including suitable sensors connected with, or positioned within, corresponding storage tanks. The simulation of utilization of the renewable fuels can be done by the testing unit 403. The testing unit 403 can simulate how the renewable fuels would be used by the vehicle 10, in order to assure the quality of the renewable fuels.

The method 800 can further include a step of absorbing heat energy by a liquid air from gaseous renewable fuels and transforming, at least partially, renewable fuels into a liquid state. A heat exchanger 203 can be configured to facilitate the heat transfer process. The heat energy taken from the gaseous renewable fuel is absorbed by a liquid air provided by the liquid air storage tank 204. After absorbing heat energy, the liquid air can be pressurized or vaporized, at least partially, into a gaseous form, and the liquid air can be separated as gases and stored individually for further use.

The method 800 can further include steps of generating heat energy and electricity for the system by a heat engine, and removing an objectionable constituent in the renewable fuels by the heat engine. The engine 201 or 301 can be used to provide heat energy H to the heat exchanger 203 (to facilitate the heat exchange process) and/or to the generator 210 (to generate electricity). Also, the engine 201 or 301 can be used to remove the objectionable constituents in the renewable fuels by combustion.

The method 800 can further include a step of converting solar energy into heat energy to generate renewable fuels, including monoxide, hydrogen, and methanol. A thermochemical reformation device 701 can use the heat energy converted by a solar device 702, to form monoxide and hydrogen (see Equations 2 above), and can further form methanol (see Equations 3 above). The generated renewable fuels can be stored in separate storage tanks for further use.

Further Examples

Valuable carbon products and clean burning hydrogen fuel can be produced from fossil hydrocarbons or locally available renewable resources such as sewage; garbage, farm wastes and forest slash along with methane from decomposing permafrost and oceanic clathrates by processes such as the reaction of Equation 4.

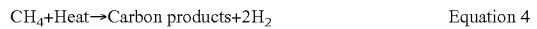

$$CH_4 + Heat \rightarrow Carbon\ products + 2H_2 \quad \text{Equation 4}$$

Equations 2 and 3 show how carbon dioxide and such hydrogen can produce liquid fuels that can be stored and shipped in the same containers or delivered by the same pipelines that now convey fossil fuels. Carbon dioxide can be provided from the atmosphere or from more concentrated sources such as the exhaust stacks of bakeries, breweries, calciners, and power plants with engines that use fuels that contain carbon such as coal, oil, and natural gas hydrocarbons.

$$CO_2 + 3H_2 \rightarrow CH_3OH + H_2O \quad \text{Equation 5}$$

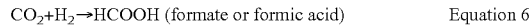

$$CO_2 + H_2 \rightarrow HCOOH\ (\text{formate or formic acid}) \quad \text{Equation 6}$$

In the process summarized by Equation 5, four molecular masses or "moles" of gases are combined to produce two moles that occupy a much smaller volume of mixed methanol and water liquids. In the process of Equation 6, two moles of gases are combined to produce one mole of much smaller liquid volume.

Reactions that produce such reductions in moles and occupied volumes provide higher product yields when provided with the impetus of increased reaction pressure. The embodiment of FIG. 4 shows the steps for production pressurized carbon dioxide by liquefaction of air or another more concentrated source of carbon dioxide. Pressurization is provided as liquid carbon dioxide forms a self-pressurized gas as heat is added.

Pressurized hydrogen from the process of Equation 4 is provided by galvanic impetus for delivery of hydrogen by proton transport across an elevated temperature proton membrane. Pressurized hydrogen can also be produced by electrolysis with increased applied voltage. Hydrogen produced from wastes such as urea or acids produced by anaerobic digestion can be provided at pressures such as 700 Bar (10, 200 PSI) and require about the same or less electrical power than electrolysis of water.

Other embodiments for hydrogen separation and pressurization are provided for operation in conjunction with various process reactions shown in Equations 7, 8 and 9. In the process of Equation 7, methane reacts with steam to produce carbon monoxide and hydrogen. Similarly typical endothermic reactions of Equations 8 and 9 produce hydrogen.

$$CH_4 + H_2O + HEAT \rightarrow CO + 3H_2 \quad \text{Equation 7}$$

$$2NH_3 + HEAT \rightarrow N_2 + 3H_2 \quad \text{Equation 8}$$

$$CO(NH_2)_2 + HEAT \rightarrow N_2 + 2H_2 + CO \quad \text{Equation 9}$$

The hydrogen can be removed and further pressurized as it is formed by transfer from the reaction zone through a semipermeable membrane. An embodiment as shown in FIG. 6 utilizes heat from an engine such as the exhaust or cooling system of an internal combustion piston or gas turbine engine. This is beneficial for purposes of shifting such reactions towards greater yields and/or allowing higher reactant pressures without reducing yields.

Proton conduction for such separation and pressurization can be provided in composites and ceramics such as perovskite ($SrCeO_3$) oxide. Such reactions at elevated temperatures produce hydrogen that is separated at increased rates by doped perovskite-type oxides. Such enhanced proton conductivity is provided with membranes such as doped $SrCeO_3$, $CaZrO_3$, $BaCeO_3$ and/or $SrZrO_3$. Suitable dopants include yttrium, ytterbium, europium, samarium, neodymium, and gadolinium.

Hydrogen separation by such oxide ceramics can be enhanced by increased pressure gradient and/or application of a DC bias. In embodiments that apply a DC bias or galvanic drive in the hydrogen separation process, the hydrogen can permeate from a lower $H_2$ pressure on one side to a higher $H_2$ partial pressure on the other side of the membrane and vice versa in which hydrogen permeates from the high pressure to the low pressure side of the membrane. In comparison a non-galvanic hydrogen separation process in which a pressure difference exists, transport is only from the high $H_2$ partial pressure side to a low $H_2$ partial pressure side of the membrane.

Catalysts may be utilized at a reaction surface to favorably influence surface exchange reactions such as various steps or processes such as summarized by Equations 1, 4, 5, and/or 6. Hydrogen permeation and thus the process yield can be enhanced by coating the membrane with a surface catalyst to reduce the activation energy for the surface exchange reactions. To some extent most anode material selections are favorable catalysts. Anodes of galvanic hydrogen pumps include porous films of Ni, Ag, Pt, and Ni/BCY porous layer. In such hydrogen pumping processes, the gas mixture in the anode and cathode zones compartments can include steam or be humidified with water vapor to improve the proton conductivity of the electrolyte and suppress its electronic conductivity.

The hydrogen separation rate increases as the applied current is increased in accordance with Faraday's law. Depending upon factors such as reactant pressure and temperature, dopant selection, membrane thickness, and humidity applied galvanic voltage gradients such as 0.2 to 20 VDC are adequate to produce substantially higher pressure hydrogen. Such net bias of galvanic voltage gradients may be produced by much higher voltage AC or DC electricity delivered to resistive and/or inductive heating of the reactor-separator tube.

Thus various mixtures of reactants and products such as $H_2$ along with CO, $CO_2$, $H_2O$, and/or $N_2$ in the anode zone can be separated to provide pressurized $H_2$ at the cathode zone. Such hydrogen pressurization driven by an applied external voltage can move hydrogen from a suitably pressurized gas mixture including reactants and products to higher pressure for delivery for denser storage and injection purposes. Thus pressurized gases that provide expansive cooling are collected on the anode side of the membrane for injection and expansive cooling before TDC and further pressurized hydrogen is delivered from the cathode side at higher pressure into storage for injection at or after TDC to produce expansive heating.

Such arrangements can be provided with the cathode on the inside diameter of a tube and the anode on the outside diameter or visa versa. Endothermic heat can be added in various steps including "$H_1$" from engine coolant at 102° C. (215° F.), "$H_2$" from engine exhaust gases 315° C. (600° F.) or higher temperature, and "$H_3$" from electrical bias and/or inductive and/or resistance at 650 to 1600° C. (1200 to 2900° F.) as may be adaptively controlled to achieve the conversion rate and pressurization of hydrogen needed for optimizing engine operation. Renewable or regenerative sources of energy for $H_3$ include regenerative deceleration of a vehicle, energy conversion streamlining of a vehicle, or utilization of off peak electricity in stationary engine applications.

Depending upon the pressure desired for hydrogen storage it is generally preferred to utilize a more or less coaxial flow circuit that provides for reactants to first gain a portion of $H_3$ from exhaust gases of a heat engine and then enter into the bore and cathode of a tube reactor and to utilize galvanic hydrogen separation and pressurization to compressively stress the reaction-separation tube as shown in FIG. 3. This provides a thermal gradient from exhaust gases to supply the first portion of $H_3$ and flexibility including rapid application of regenerative energy to provide additional $H_3$ at higher adaptively controlled temperatures and/or from other electricity sources as may be needed to produce hydrogen at the desired rate and/or pressure needed to optimize direct injection and stratified charge combustion in engine operations.

Illustratively following reaction and separation gases from the bore or anode can be injected before TDC to produce expansive cooling and reduction of back work to boost BMEP. Reactants delivered to the anode within the tube bore at 61 Bar (900 PSI) can be reacted to produce hydrogen that is removed to improve the reaction yield and delivered by galvanic separation at voltage gradients of 0.2 to 20 VD to the cathode at the outside zone of the separator tube at 122 Bar (1800 PSI) to facilitate direct injection at or after TDC with expansive heating and pressure additions to boost BMEP.

Thus engines applied to air compression and/or liquefaction processes and/or production of electricity are provided with increased thermal and fuel efficiencies by these thermo-electro-chemically advantaged processes and operations. This includes operation of engines that provide gas compression in one or more combustion chambers and produce power at other times in the same or other combustion as disclosed in U.S. patent application Ser. No. 13/802,202 and entitled Multi-Stage Compressors and Associated Systems, Processes and Methods filed on Mar. 13, 2013, and incorporated herein in its entirety by reference.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this application.

To the extent not previously incorporated herein by reference, the present application incorporates by reference in their entirety the subject matter of each of the following materials: U.S. patent application Ser. No. 13/027,208, filed on Feb. 14, 2011, now U.S. Pat. No. 8,318,131, and titled CHEMICAL PROCESSES AND REACTORS FOR EFFICIENTLY PRODUCING HYDROGEN FUELS AND STRUCTURAL MATERIALS, AND ASSOCIATED SYSTEMS AND METHODS; U.S. patent application Ser. No. 13/026,996, filed on Feb. 14, 2011 and titled REACTOR VESSELS WITH TRANSMISSIVE SURFACES FOR PRODUCING HYDROGEN-BASED FUELS AND STRUCTURAL ELEMENTS, AND ASSOCIATED SYSTEMS AND METHODS; U.S. patent application Ser. No. 13/027,015, filed on Feb. 14, 2011 and titled CHEMICAL REACTORS WITH RE-RADIATING SURFACES AND ASSOCIATED SYSTEMS AND METHODS; U.S. patent application Ser. No. 13/027,244, filed on Feb. 14, 2011 and titled THERMAL TRANSFER DEVICE AND ASSOCIATED SYSTEMS AND METHODS; U.S. patent application Ser. No. 13/026,990, filed on Feb. 14, 2011, now U.S. Pat. No. 8,187,549 and titled CHEMICAL REACTORS WITH ANNULARLY POSITIONED DELIVERY AND REMOVAL DEVICES, AND ASSOCIATED SYSTEMS AND METHODS; U.S. patent application Ser. No. 13/027,181, filed on Feb. 14, 2011, now U.S. Pat. No. 8,187,550, and titled REACTORS FOR CONDUCTING THERMOCHEMICAL PROCESSES WITH SOLAR HEAT INPUT, AND ASSOCIATED SYSTEMS AND METHODS; U.S. patent application Ser. No. 13/027,215, filed on Feb. 14, 2011, now U.S. Pat. No. 8,318,269, and titled INDUCTION FOR THERMOCHEMICAL PROCESS, AND ASSOCIATED SYSTEMS AND METHODS; U.S. patent application Ser. No. 13/027,198, filed on Feb. 14, 2011 and titled COUPLED THERMOCHEMICAL REACTORS AND ENGINES, AND ASSOCIATED SYSTEMS AND METHODS; U.S. Provisional Patent Application No. 61/385,508, filed on Sep. 22, 2010 and titled REDUCING AND HARVESTING DRAG ENERGY ON MOBILE ENGINES USING THERMAL CHEMICAL REGENERATION; U.S. patent application Ser. No. 13/027,060, filed on Feb. 14, 2011, now U.S. Pat. No. 8,318,100, and titled REACTOR VESSELS WITH PRESSURE AND HEAT TRANSFER FEATURES FOR PRODUCING HYDROGEN-BASED FUELS AND STRUCTURAL ELEMENTS, AND ASSOCIATED SYSTEMS AND METHODS; U.S. Provisional Patent Application No. 61/237,419, filed on Aug. 27, 2009 and titled CARBON SEQUESTRATION; U.S. patent application Ser. No. 13/027,068, filed on Feb. 14, 2011, now U.S. Pat. No. 8,318,997, and titled CARBON-BASED DURABLE GOODS AND RENEWABLE FUEL FROM BIOMASS WASTE DISSOCIATION; U.S. patent application Ser. No. 13/027,196, filed on Feb. 14, 2011, now U.S. Pat. No. 8,912,239, and titled CARBON RECYCLING AND REINVESTMENT USING THERMOCHEMICAL REGENERATION; U.S. patent application Ser. No. 13/027,195, filed on Feb. 14, 2011, now U.S. Pat. No. 8,784,095, and titled OXYGENATED FUEL; U.S. Provisional Patent Application No. 61/237,425, filed on Aug. 27, 2009 and titled OXYGENATED FUEL PRODUCTION; U.S. patent application Ser. No. 13/027,197, filed on Feb. 14, 2011, now U.S. Pat. No. 8,070,835, and titled MULTI-PURPOSE RENEWABLE FUEL FOR ISOLATING CONTAMINANTS AND STORING ENERGY; and PCT Application No. US11/64034, filed on Dec. 8, 2011 and titled SYSTEM AND METHOD FOR PREPARING LIQUID FUELS.

I claim:

1. A system for providing customized renewable fuels to a user, comprising:
   a first storage tank for storing a first renewable fuel;
   a second storage tank for storing a second renewable fuel;
   a communicator, receiving a first set of information from the user;
   a controller, receiving the first set of information from the communicator and generating a second set of information by analyzing the first set of information;
   a dispenser, connected to the first and the second storage tanks, selectively dispensing the first and the second renewable fuels to the user according to the second set of information; and
   a quality assurance module, configured to control qualities of the renewable fuels, further including:
      a monitoring unit to monitor statuses of the renewable fuels in the system; and
      a testing unit to simulate the user's utilization of the renewable fuels.

2. The system of claim 1, wherein the first set of information is provided automatically to the communicator via a user-end communication device.

3. The system of claim 1, wherein the first set of information is received by the communicator via detecting a status of a vehicle.

4. The system of claim 1, wherein the first set of information is provided to the communicator by the user's manual input.

5. The system of claim 1, wherein the renewable fuels to be dispensed are mixed before dispensing to the user and are stored in a pre-mixed storage tank.

6. The system of claim 1, wherein the communicator provides a third set of information to the user.

7. The system of claim 1, further comprising:
   a heat engine, configured to generate heat energy and electricity for the system and remove an objectionable constituent in the renewable fuels.

8. The system of claim 1, further comprising:
   a solar device, configured to convert solar energy into heat energy used for generating at least one of monoxide, hydrogen, and methanol.

9. The system of claim 1, further comprising:
   an electrolyzer, configured to improve the purity of the renewable fuels and wherein the renewable fuels includes hydrogen.

10. The system of claim 1, further comprising:
    a third storage tank connected to the dispenser, for storing the first renewable fuel with higher purity than the first renewable fuel stored in the first storage tank; and
    a fourth storage tank connected to the dispenser, for storing the second renewable fuel with higher purity than the second fuel stored in the second storage tank;
    wherein the dispenser selectively dispenses the renewable fuels from the third and the fourth storage tank according to the second set of information.

11. A system for providing customized renewable fuels to a user, comprising:
    a first storage tank for storing a first renewable fuel;
    a second storage tank for storing a second renewable fuel;
    a communicator, receiving a first set of information from the user;
    a controller, receiving the first set of information from the communicator and generating a second set of information by analyzing the first set of information;
    a dispenser, connected to the first and the second storage tanks, selectively dispensing the first and the second renewable fuels to the user according to the second set of information; and
    a heat exchanger, configured to use a liquid air to absorb heat energy from gaseous renewable fuels and to transform, at least partially, the renewable fuels into a liquid state.

12. A method for providing customized renewable fuels to a user, comprising:
    storing a first renewable fuel in a first storage tank;
    storing a second renewable fuel in a second storage tank;
    receiving a first set of information from the user via a communicator;
    transmitting the first set of information to a controller;
    generating a second set of information by the controller by analyzing the first set of information;
    selectively dispensing the first and the second renewable fuels to the user according to the second set of information; and controlling qualities of the renewable fuels by monitoring statuses of the renewable fuels and simulating the user's utilization of the renewable fuels.

13. The method of claim 12, wherein the first set of information is provided automatically to the communicator via a user-end communication device.

14. The method of claim 12, wherein the first set of information is received by the communicator via detecting a status of a vehicle of the user.

15. The method of claim 12, wherein the first set of information is provided to the communicator by the user's manual input.

16. The method of claim 12, further comprising:
mixing the renewable fuels to be dispensed before dispensing; and
storing the mixed renewable fuels in a pre-mixed storage tank.

17. The method of claim 12, further comprising:
providing a third set of information to the user.

18. The method of claim 12, further comprising:
generating heat energy and electricity for the system by a heat engine; and
removing an objectionable constituent in the renewable fuels by the heat engine.

19. The method of claim 12, further comprising:
converting solar energy into heat energy to generate at least one of monoxide, hydrogen, and methanol.

20. The method of claim 12, further comprising:
improving the purity of the renewable fuels by electrolysis, wherein the renewable fuels includes hydrogen.

21. A method for providing customized renewable fuels to a user, comprising:
storing a first renewable fuel in a first storage tank;
storing a second renewable fuel in a second storage tank;
receiving a first set of information from the user via a communicator;
transmitting the first set of information to a controller;
generating a second set of information by the controller by analyzing the first set of information;
selectively dispensing the first and the second renewable fuels to the user according to the second set of information; and
absorbing heat energy, by a liquid air, from gaseous renewable fuels and transforming, at least partially, the renewable fuels into a liquid state, and wherein the liquid air is pressurized as at least one type of gas.

* * * * *